Nov. 2, 1948.   S. M. FAIRCHILD   2,452,739
METHOD OF FORMING HOLLOW LAMINATED STRUCTURES
Filed Nov. 27, 1943
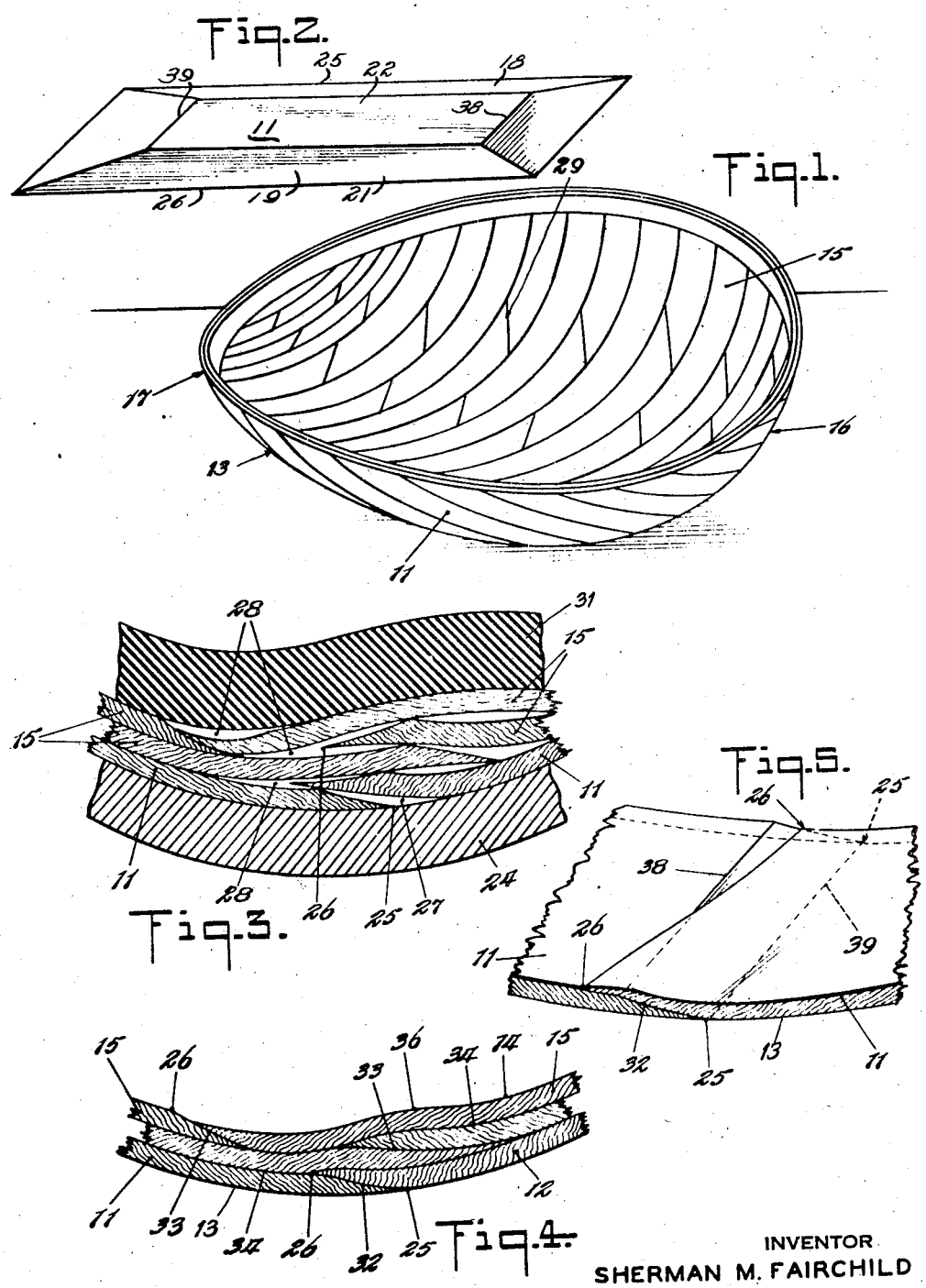
INVENTOR
SHERMAN M. FAIRCHILD
ATTORNEY Patented Nov. 2, 1948

2,452,739

UNITED STATES PATENT OFFICE 2,452,739

METHOD OF FORMING HOLLOW LAMINATED STRUCTURES

Sherman M. Fairchild, New York, N. Y., assignor, by mesne assignments, to William B. Scarborough, as trustee Application November 27, 1943, Serial No. 512,009

7 Claims. (Cl. 154—110)

This invention pertains to the art of molding wood or the like materials, and is directed to a novel method of fabricating a molded assembly.

This application is a continuation-in-part of application Serial No. 388,812, now Patent No. 2,392,844.

Under the usual practice of molding wood or the like material, thin strips of the material are provided, and are laid side by side on a rigid form. One layer of strips of the material is laid on the form to comprise a face ply, and additional plies are usually laid successively on the face ply and on top of each other, until the desired thickness is attained. The resultant layup is covered with a flexible blanket or bag, usually consisting of rubber, to complete a package. The package is usually subjected to the pressure of a fluid which presses the layup against the surface of the die. An adhesive is applied to contacting surfaces between plies, and the pressure is maintained on the layup while the adhesive sets. This fabricates the assembly, formed to the contour of the die surface.

An example of the practice of this art is set forth in the patent to Potchen et al., No. 2,308,453, of January 12, 1943.

The usual prior art practice is to form butt joints between adjacent strips of a given ply. The proximate edges of adjacent strips are tailored or fayed to exactly match each other. The prior art practice undertakes to adhere proximate butt joint edges of adjacent strips together to close the joints. However, the prior art practice of closing butt joints is not very successful.

It is generally recognized that good adhesion between pieces cannot be attained unless they are subjected to pressure normal to the surface of contact between pieces. Pressure is required to produce a thin glue line, which is requisite to good bonding. It will be appreciated that the pressure applied to layups, for example under practice of the patent, No. 2,308,453, is not directed normal to surfaces of contact in butt joints between adjacent strips in a given ply. Accordingly, the prior art practice of fabricating assemblies is not conducive to forming firm bonds in butt joints between adjacent strips.

In addition, if the moisture content of the materials comprising the strips changes between the time they are cut to shape and the time they are molded, the dimensions of the material will change sufficiently to give either an open joint, or one in which edges will overlap each other. It is not uncommon for wood veneer to change 2% in dimension due to a change in moisture content, and in the case of strips 5" wide, this would involve 1/10" dimension change. This, for obvious reasons, would give an unsatisfactory joint.

In addition to the problem of maintaining the moisture content of the strips, and their dimensional stability, between the time they are cut to shape and the time that they are placed in the form, there is another phase of the operation which again affects their moisture content and their dimensions. It is usual practice to apply heat for curing and setting the adhesive, and moisture is released by the curing operation incident to the application of heat. The presence of this moisture causes a variation of the moisture content of the ply material, which results in dimension changes and incident bad joints.

It is also well recognized in the art that it is difficult to produce layups in which adjacent strips contact each other at all points along their proximate edges, and this is especially true when assemblies are formed with compound curvature. The work of making layups, which includes faying the edges of adjacent strips to match each other accurately, requires a high degree of skill, and is time consuming and costly.

Finally, the layup is made with the strips positioned relatively lightly pressed against the surface of the die. When the layup is subjected to pressure, such as the fluid pressure applied under the practice of the referred to patent, No. 2,308,453, the component strips of the layup shift into conforming engagement with the surface of the die. This shifting is inevitable, and it results in the edges of adjacent strips moving out of the relative positions they occupied after the layup operation. Regardless of how accurately the strips have been tailored and positioned in the layup operation, it is almost inevitable that the strips will shift in the molding operation, and in some places the strips will separate, whereas it is not uncommon that in other places they shift into overlapping relationship.

When butt joints have been made with utmost care, and the appearance of the assembly indicates they are well bonded, it is frequently found that the joints are weak, and with continued use of the article comprising the assembly, and its flexing in normal use, one or more points of failure may appear along butt joints. Failure may also occur in butt joints after a time, even though the article of the assembly has not been put to use, due probably to internal strains set up in the fabricating process, or to changes in atmospheric conditions affecting points in butt joints which are under internal strain. Wherever a thick glue line exists, the space is occupied by resin, which is more dense and less flexible than the wood of the veneer and at such points failure may occur.

Another factor is that paint will not adhere to resin which is set. For this reason, the first failures of finishes comprising paints are found above thick resin joints.

The failure of a joint, it will be readily understood, is the failure of the ply containing the joint, and this has the result of rendering the ply with a glue joint failure practically useless in the assembly.

The present invention is directed to a novel joint between adjacent strips of plies in a layup, which is to be molded under a practice, for example, such as is disclosed in the patent, No. 2,308,-453, referred to.

According to the practice of the present invention, the strips which comprise the plies of a layup are bevelled or feathered along their edges. Adjacent strips in any given ply are positioned in the layup, with their proximate edges overlapping each other. Thus, when fluid pressure is applied to the layup normal to the surface of the die, the pressure at overlapping edges of adjacent strips in any given ply will be normal to surface of contact between the strips. Thus, the application of pressure under the normal molding operation will be in a direction conducive to making thin glue lines at joints. Furthermore, the surfaces of contact between overlapping strips is much wider, and the overlap joint is therefore stronger, than the maximum width attained by butt joints.

The angle of bevel can be varied within wide limits without departing from the scope of the invention. It is preferred, however, that the edges of the strips be feathered or scarfed, the angle of the scarf being as sharp as is practicably possible, so that there is a minimum break in contour of the surfaces of the strips containing the scarf, and whereby both faces of the strip are virtually continuous from edge to edge.

It would appear to be preferable that the overlap at the edges of adjacent strips be equal to the extent of the bevel, because this gives a thickness through the overlap most nearly equal to the thickness of each strip. However, it requires a high degree of skill to make the overlap exactly equal to the extent of bevel, and the work of making such a layup is tedious, time consuming and costly. This is especially true in structures with complex contours involving simple or compound curvatures.

Actually it is not necessary that the overlap be equal to the extent of bevel because variations in thickness of the assembly do not affect the strength of the article adversely. Usually it is required that only one surface of the assembly be smooth and regular. Any irregularities of surface contour due to variations in thickness are, because of the nature of the molding process, confined to one surface of the article, and this is satisfactory in most cases, and does not detract from the utility, strength and appearance of the article of the assembly.

Accordingly, under recommended practice of the present invention, the overlap of contiguous edges of adjacent strips is made to only approximately equal the extent of bevel when the fabrication of the assembly is complete. The extent of overlap can be greater than, or less than, the extent of bevel, and can vary within wide limits.

In the molding operation the material of the layup will be pressed to conform one of its surfaces to the desired contour predetermined by the contour of the die surface. There will be variations in thickness, and corresponding irregularities of surface contour, but such irregularities at overlap joints will be confined to the surface of the assembly opposite the one which contacted the rigid die surface. If required, such irregularities can be readily removed when both surfaces of the assembly must be regular.

It will be appreciated that, under practice of the present invention, layups can be made by less skilled operators, in less time and at less cost. The prior art practice of tailoring strips to an exact contour for precise abuttment, usually including a cut and try method, is eliminated.

The present invention includes the practice of applying pressure, and usually heat, to set the adhesive to adhere together the various pieces comprising the assembly. The pressure will cause the strips to shift and adjust themselves to the contour of the die surfaces. Under prior art practice such shifting and adjustment of strips was feared as a cause of defective assemblies, and every effort was made to avoid it. Under practice of the present invention, it is desirable and advantageous that the strip adjustment take place, so that reproduction of the contour of the die surface in the assembly be accurate and complete, and in order that thin glue lines be attained.

Having thus stated the nature of the invention, a better understanding thereof will be attained from the drawings, which show one embodiment of the invention as applied practically to one typical article of assembly. In the drawings—

Figure 1 shows, in perspective, a structural assembly embodying the present invention, Figure 2 is a perspective view of the strips employed in the practice of the present invention, Figure 3 illustrates in cross-section a ply layup preparatory to it being formed and adhered together to comprise a structural assembly.

Figure 4 illustrates in cross-section, the structural assembly resulting from the layup of Figure 3, and Figure 5 is a fragmentary schematic view in perspective, to illustrate possible disposition of adjacent strips of a ply in the ply structure.

The illustrated example of Figure 1, constitutes a shell such, for example, as would be suitable for use as a member of an aircraft fuel tank. This member is chosen as a convenient medium for illustrating the principles of the invention involved, and it should not be construed as limiting the scope of the invention. The assembly of Figure 1 presents a structure with compound curvature, but the invention is equally applicable to flat pieces and simple curvatures.

The structural assembly illustrated in Figure 1 comprises a plurality of strips 11, laid side by side to form a face ply 12, comprising one surface 13 of the assembly.

Within the scope of the invention, the structure may comprise the face ply 12 of strips 11, either alone or together with one or more additional plies of the same or of different material. In the embodiment shown, the structure comprises a plurality of plies, of which one face ply 12 presents the outside surface 13 of the shell, and the opposite face ply presents the opposite surface 14, which constitutes the inside surface of the shell. The inside face ply, in the embodiment shown, comprises strips 15, which are laid side by side in a manner similar to the ply comprising outside face ply 12. There can be as many intermediate core plies as are desired, comprising strips 15 laid up on the face ply 12, and on each other, until the final inside face ply is laid up to comprise the surface 14. The disclosed embodiment presents one intermediate core ply to comprise a three-ply assembly.

As shown in Figure 2, each strip 11, is of a predetermined thickness, strips 15 being of like construction and the several plies are built up and adhered together to comprise a structure of the desired thickness. The thickness of strips in any given ply are usually the same, but the respective different plies may, and frequently do, comprise strips of different thicknesses.

The degree of thickness of the several plies depends to some extent on the degree of curvature of the structure, and a thinner veneer is selected for sharp curvatures than is required for less severe curvatures. Also, the width of the strip is determined to some extent by the amount of curvature the piece is to be subjected to. For example, in places where the curvature is greater as at the ends 16 and 17 of the structure shown in Figure 1, the strips must be narrow, and they can be wider between the ends 16 and 17 where they are flexed to a lesser extent in a plurality of directions.

As shown in Figure 2, the side edges of the strip are bevelled, as at 18 and 19. The amount of bevel can be varied within wide limits without departing from the scope of the invention, but in the preferred practice, the edges at 18 and 19 are feathered or scarfed. Thus, the bevels at 18 and 19 present sharp angles to the surface 21, and continue into the opposite surface 22 practically without abrupt angular change. In this manner, the surfaces of both faces 21 and 22 of the strip are virtually continuous from edge to edge.

The edges 25 and 26 of the several strips may be parallel, or they may be tailored or contoured to fit, together with other strips, to present smooth coverage of the layup. In actual practice, especially in a layup of compound curvature as illustrated in Figure 2, each strip is tailored to fit a predetermined area of the layup, the several strips being numbered to insure that they be properly located in their predetermined position in the assembly. The edges of each strip are feathered at 18 and 19, as a separate operation, after it has been tailored to fit the area it is to occupy in the assembly.

Each strip 11 and 15 may be made of a length to extend from edge to edge of the layup. However, under one practice, it is preferred that some or all strips extend less than the full distance from edge to edge of the layup. Under this practice it is preferred that each strip extend from the edge of the layup to a position where it meets and overlaps the edge of another strip extending toward it from the opposite edge of the layup. Thus at least one end of each strip may be cut cross-cut, or at an angle, to meet the proximate edge of another strip along the lines 29 of Figure 1. Such overlapping ends of strips in a given band will be feathered along their overlapping edges 29 in a manner similar to the feathering 18 and 19 along the side edges. The object of this construction is to permit the strips disposed end to end to adjust themselves longitudinally relative to each other, under the pressure of molding the layup to form an assembly.

In the practice of the invention, the strips 11 or 15 of any given ply are laid up side by side on the surface of the die 24 or on the surface of the previously laid up ply, with proximate edges 25 and 26 of adjacent strips overlapping. The position of the strip in the assembly is fixed by any suitable means, one practice being to attach the end of the strip to the rigid surface of the die at the border of the assembly, for example by tacking.

In the case of strips extending from border to border of the assembly, each strip is tacked at its opposite ends to fix it in position in the assembly. In the practice shown in Figure 1, two strips are disposed end to end to extend from border to border of the assembly, the two strips being overlapped at 29, where their proximate ends meet. Each strip is tacked at one of its ends positioned at the border of the layup, and extends towards the opposite border, meeting another strip end to end which extends toward it from the opposite border.

The structure comprising strips disposed end to end leaves one end of each strip free and unrestricted, and affords liberal freedom for the several strips to adjust themselves to the contour of the die, under action of the molding pressure. The position of the overlap 29 can be at any point between borders, but it is preferred that the overlap in adjacent strips be staggered, as shown in Figure 1.

The extent of overlap at proximate side and end edges of adjacent strips may vary within wide limits and can be the same as, greater than, or less than, the extent of the bevel 18 and 19. In making the layup, under the preferred practice of the present invention, the operator simply lays two end to end strips beside the next previously laid strips, and at two or three points along contiguous edges provides an overlap which will approximately equal the amount of bevel when the layup is subjected to molding pressure. Likewise the amount of overlap at 29 where strips meet end to end is made to approximately equal the extent of bevel after molding. Under this practice, it will be noted that the extent of overlap may deviate from the extent of bevel at various points along the lengths of proximate side edges, and at proximate end edges.

As noted in Figure 3, when the layup is made, the strips will not lie flat against the surface of the die 24 at all points, but will lie spaced away from the surface thereof to a greater or lesser extent as at 27, due to the feathering of the edges and also due to the pieces being not naturally curved to the contour of the die. In the layup shown in Figure 3, additional plies comprising the strips 15 are laid on top of the ply comprising the strips 11 and are overlapped in a similar manner, the extent of overlap approximating the extent of bevel but deviating along the lengths of the contiguous edges. The additional ply presents additional spaces 28 due to the scarfing and the nature of the layup. The embodiment shown in Figures 3 and 4 presents a three-ply construction, but the principles of the invention apply to an assembly of any desired number of plies.

On top of the uppermost ply, a covering 31, comprising a blanket or bag of rubber or like material, is laid in the manner illustrated in Figure 3. Now, under preferred practice, a vacuum is drawn, and the air between the blanket 31 and the die 24 is exhausted in a manner described more fully in the patent to Potchen et al., No. 2,308,453, previously referred to. This subjects the outer surface of the blanket 31 to atmospheric pressure which is transmitted through the layup against the surface of the die 24. This pressure, being a static fluid pressure, is normal to the surface of the die 24 at all points in its area.

Under the application of fluid pressure, the several strips 11 and 15 will shift and adjust themselves to the position they occupy in the assembly. In the case of butt joints between strips, it will be understood, in some places the contiguous edges of adjacent strips are spread apart and form open seams, whereas in other places, adjacent strips may be pressed together and caused to overlap. Under the practice of the present invention, this shifting of the several strips of the ply has the effect of changing the extent of overlapping slightly, to a greater or less amount from that which was originally applied in the layup. However, when the assembly is complete, there will be an overlap between adjacent strips at joints, and this overlap, at 32 and 33 in Figure 4, presents an extensive surface of juncture between adjacent strips in a given ply, which is continuous with surfaces of juncture between plies.

Under the applied atmospheric pressure, and preferably with the application of additional pressure in the process disclosed in Patent No. 2,308,453, the adjacent strips are adhered together along their surfaces of contact at the overlap between contiguous edges 25 and 26. Also the several plies are adhered together along their contacting surfaces. The structure having been compressed in the manner described, the open spaces 27 and 28 are removed, and any air contained in these spaces is exhausted by the applied vacuum, together with any gases generated in the adhesive curing process.

The resultant ply structure is illustrated in Figure 4, and as shown therein, strips 11 of the face ply are adhered together along contacting surfaces of the overlap 32. Also strips 15 of the core and opposite face plies are adhered together along contacting surfaces of the overlaps 33. Also, the strips 11 and 15 of the respective plies are adhered together at the contacting surfaces 34 between plies, making a composite ply structure thoroughly adhered together.

The surface 13 which was formed against the surface of the die 24 has a regular curvature which conforms with the curvature of the surface of the die. The surface 14 of the opposite face ply comprising strips 15 will, in general, be parallel with the curvature of the surface 13, but it will usually deviate from parallelism to a greater or lesser extent opposite overlapping joints 32 and 33. Figures 3 and 4 illustrate the case of a plurality of overlaps 32 and 33 being opposite each other, producing the high spot 36, this being the situation where two lines of juncture in different plies intersect.

It will be noted that the structure of Figure 4 is shown on an exaggerated scale to illustrate the nature of the invention. Usually, the high spot 36 is much less relative to the thickness of the assembly than is indicated in Figure 4.

Figure 5 illustrates schematically what might be expected to take place along overlapping joints in any given ply. Along the length of a juncture, the distance between contiguous edges 25 and 26 will vary, and the extent of overlp will equal, be greater than, or less than, the extent of bevel. The edges 25 and 26 may cross the lines 39 and 38, which mark the juncture of the bevels with the surface 22, Figure 2. Accordingly, the thickness of the joint may vary from less than to more than the thickness of the ply. In actual practice the thickness of the ply structure will be virtually the same throughout its area, but there will be slight irregularities in the surface 14, Figure 3. Under the practice of the invention, the irregularities will be confined to one surface 14, the opposite surface 13 being regular, and conforming with the contour of the surface of the die.

In those cases in which it is desirable to have regular curvature on both surfaces of a shell structure, irregularities in curvature can be readily removed by any suitable finishing operation.

Having thus fully disclosed the nature of the invention, it will be noted that it is not limited to the embodiment shown and described. The scope of the invention is determined by the accompanying claims.

I claim:

1. The art of fabricating a structural assembly of suitable material, which comprises forming the material into strips of predetermined lengths and widths, bevelling side and end edges of the strips, applying adhesive to the strips, laying strips on a rigid die surface in side by side relationship with proximate side edges of adjacent strips overlapping, disposing the strips in pairs with the strips of each pair extending end to end from border to border of the assembly, fixing an end of each strip of a pair to the die surface so that their free ends overlap, applying pressure to press the material against the die surface to cause the strips to adjust themselves to the contour of the die surface and the overlaps to deviate from their original extents to whatever extents they assume under the applied pressure, and adhering together contacting surfaces of adjacent strips disposed side by side and end to end.

2. The art of fabricating a structural assembly of suitable material, which comprises forming the material into elongated strips having substantially straight edges; bevelling the edges of the strips to be adhered together, applying adhesive to the strips; placing the strips on a rigid die surface, the strips being arranged in pairs, the strips of each pair being disposed end to end so that the proximate ends of each pair overlap, the far ends of each pair being fixed with respect to the die surface, the several pairs being arranged in side to side relationship so that proximate sides of adjacent pairs overlap, the overlapping strips forming a ply; applying fluid pressure to press the material against the die surface and to cause the strips to adjust themselves to the contour of the die surface and the overlaps to shift from their original extents to the extents they assume under the applied pressure and after adjustment on the die; and adhering together contacting surfaces of adjacent strips.

3. The art of fabricating a structural assembly of suitable material, which comprises forming the material into elongated strips having substantially straight edges; bevelling the edges of the strips to be adhered together; applying adhesive to the strips; placing the strips on a rigid curved die surface, the strips of each ply being arranged in pairs, the strips of each pair being disposed end to end so that the proximate ends of each pair overlap to a predetermined extent which in the fabricated assembly is approximately equal to the extent of the bevel, the far ends of each pair being fixed with respect to the die surface, the several pairs being arranged in side to side relationship so that proximate sides of adjacent pairs overlap to a predetermined extent which in the fabricated assembly is approximately equal to the extent of the bevel; applying fluid pressure to press the material against the die surface to cause the strips to adjust themselves to the contour of the curved die surface and simultaneously the overlaps to shift from their original extents to the extents they assume under the applied pressure and after adjustment on the die curvature; and adhering together contacting surfaces of adjacent strips.

4. The art of fabricating a structural assembly of suitable material, which comprises forming the material into elongated strips having substantially straight edges; bevelling side and end edges of the strips to be adhered together; applying adhesive to the strips; placing the strips on a rigid curved die surface in side by side and end to end relationship to form a ply in which proximate side and end edges of adjacent strips overlap, and securing one end of each strip with respect to the die surface leaving the remainder of the strip free to shift; applying fluid pressure directed normal to the die surface at all points in its area to press the material thereagainst to cause the strips to adjust themselves to the curved contour of the die surface and simultaneously the overlaps to shift from their original extents to the extents they assume under the applied pressure and after adjustment on the die, and adhering together contacting surfaces of adjacent strips while under the applied pressure.

5. The art of fabricating a structural assembly of suitable material, which comprises forming the material into elongated strips having substantially straight side and end edges; bevelling the edges of the strips to be adhered together; applying adhesive to the strips; placing the strips on a rigid curved die surface in side by side relationship to form a ply in which proximate side and end edges overlap and securing one end of each strip with respect to the die surface leaving the remainder of the strip free to shift; laying one or more similar plies on the first ply; applying fluid pressure directed normal to the curved die surface at all points in its area to press the material thereagainst and to cause the strips simultaneously to adjust themselves to the contour of the die surface and the overlaps to shift from their original extents to the extents they assume under the applied pressure and after adjustment on the die; and adhering together contacting surfaces of adjacent strips and adjacent plies while under the applied pressure.

6. The art of fabricating suitable material into a structural assembly having surfaces of compound curvature, which comprises forming the material into flat elongated strips having substantially straight side and end edges; bevelling the side and end edges of the strips to be adhered together; applying adhesive to the strips; placing the strips in side by side relationship on a rigid curved die surface of predetermined contour conforming with the desired contour of the surface of the structure; overlapping proximate bevelled edges of adjacent strips; securing at least one end of each strip with respect to the die surface leaving the remainder of the strip free to shift; applying fluid pressure directed normal to the die surface at all points in its area to press the material thereagainst to cause the strips to adjust themselves to the contour of the die surface and the overlaps to shift simultaneously from their original extents to extents they assume under the applied pressure and after adjustment on the die; and adhering together contacting surfaces of adjacent strips while under pressure.

7. The art of fabricating suitable material into a structural assembly on a die surface with compound curvature, which comprises forming the material into flat elongated strips having substantially straight side and end edges; the strips being of widths sufficiently narrow to permit their being stressed to conform with the curvature of the die without danger of fracture; bevelling the side and end edges of the strips, applying adhesive to the strips; placing the strips on the die surface in side by side relationship to cover the area of the surface to form a ply, overlapping proximate side and end edges of adjacent strips, and securing one end of each strip with respect to the die, leaving the remainder of the strip free to shift; applying fluid pressure directed normal to the die surface at all points in its area to press the material thereagainst, the pressure causing the strips to adjust themselves to the contour of the die surface and the overlaps to shift simultaneously from their original extents to the extents they assume under the applied pressure and adjustment on the die; and adhering together contacting surfaces between strips to fabricate the structural assembly with a surface corresponding to the contour of the die surface.

SHERMAN M. FAIRCHILD.

REFERENCES CITED

The following references are of record in the file of this patent:

UNITED STATES PATENTS

| Number | Name | Date |
| --- | --- | --- |
| 796,545 | Watson | Aug. 8, 1905 |
| 1,396,971 | Meyercord | Nov. 15, 1921 |
| 2,172,093 | Thompson et al. | Sept. 5, 1939 |
| 2,297,353 | Goss | Sept. 29, 1942 |
| 2,306,151 | Bailey | Dec. 22, 1942 |
| 2,344,722 | Pasquier | Mar. 21, 1944 |
| 2,389,944 | Winkel | Nov. 27, 1945 |
| 2,392,844 | Fairchild | Jan. 15, 1946 |